(12) United States Patent
Bauer et al.

(10) Patent No.: US 6,528,594 B1
(45) Date of Patent: Mar. 4, 2003

(54) FLOWABLE GLANULATES

(75) Inventors: Michael Bauer, Wittnau (DE); Christoph Rickert, Reinach (CH)

(73) Assignee: Vantico Inc., Brewster, NY (US)

( * ) Notice: Subject to any disclaimer, the term of this patent is extended or adjusted under 35 U.S.C. 154(b) by 0 days.

(21) Appl. No.: 09/743,501

(22) PCT Filed: Jul. 10, 1999

(86) PCT No.: PCT/EP99/04861

§ 371 (c)(1),
(2), (4) Date: Jan. 10, 2001

(87) PCT Pub. No.: WO00/05292

PCT Pub. Date: Feb. 3, 2000

(30) Foreign Application Priority Data

Jul. 21, 1998 (CH) ............................................. 1543/98

(51) Int. Cl.[7] .............................................. C08L 67/02
(52) U.S. Cl. ................ 525/438; 23/313 FB; 23/293 A; 159/47.2; 159/48.1; 241/26; 523/456; 523/461; 525/510
(58) Field of Search ............................. 427/213, 213.3, 427/213.36; 241/26; 159/47.2, 48.1; 23/313 FB, 293 A; 523/456, 461; 525/510, 438

(56) References Cited

U.S. PATENT DOCUMENTS

| | | | |
|---|---|---|---|
| 3,879,855 A | 4/1975 | Weiser et al. | |
| 4,946,653 A | 8/1990 | Stopp et al. | |
| 4,946,654 A | 8/1990 | Uhlemann et al. | |
| 5,213,820 A | 5/1993 | Uhlemann et al. | |
| 5,294,683 A | 3/1994 | Cotting et al. | |
| 5,383,940 A | 1/1995 | Böber et al. | |
| 5,525,685 A | 6/1996 | Renner et al. | |

FOREIGN PATENT DOCUMENTS

| | | |
|---|---|---|
| DE | 29 41 637 | 10/1979 |
| DE | 43 04 809 | 2/1993 |
| EP | 787 682 | 8/1997 |

*Primary Examiner*—Robert Dawson
*Assistant Examiner*—D. Aylward
(74) *Attorney, Agent, or Firm*—Proskauer Rose LLP; Kristin Neuman, Esq.

(57) ABSTRACT

A process for the manufacture of a flowable granulate by means of spray granulation, which comprises using as starting material a formulation in liquid form comprising
(a) a substance or a mixture of substances that is in the form of a waxy or cohesive solid at room temperature, and
(b) up to 20% by weight, based on the amount of component (a), of a substance having a specific surface >3 $m^2/g$ that is insoluble in component (a), yields granulates that have a narrow particle size distribution and a low dust content and that are stable to storage.

17 Claims, No Drawings

FLOWABLE GRANULATES

The present invention relates to a process for the manufacture of a flowable granulate and to a specific granulate manufactured from epoxy resins and substances having a high specific surface that are insoluble therein.

Polyglycidyl compounds are often used today as a reactive component of curable compositions, for example as hardeners or cross-linking agents in powder coating compositions based on polyesters. Many polyglycidyl compounds are liquid or semi-solid at room temperature or slightly elevated temperature and therefore have only a limited suitability for powder coating applications.

U.S. Pat. No. 5,525,685 describes solid compositions consisting of liquid or semi-solid epoxy resins and solid colloidal condensation polymers of urea or melamine and formaldehyde, which compositions are suitable as hardeners for powder coating compositions. The solidification of liquid epoxy resins requires, however, relatively high quantities of the inert condensation polymer, which results in a relatively low epoxy content in the powder coating composition hardener.

U.S. Pat. No. 5,294,683 describes the preparation of solid solutions by melting and subsequently cooling a mixture of at least one polyglycidyl compound that is solid at room temperature and at least 5% by weight of a polyglycidyl compound that is liquid at room temperature. The solid products so obtained are substantially free of inert components and have a high epoxy content. In that process, the solid products are obtained in the form of flakes that have a tendency to cake when stored for relatively long periods. Before being processed to form powder coating compositions, those flakes are ground to powders by various processes (e.g. by cryo-grinding), there being obtained, however, a material having a high dust content and a broad particle size distribution.

The problem of the present invention was to develop a process for the manufacture of free-flowing granulates of defined particle size and narrow particle size distribution that are stable to storage and have a low dust content.

Granulates having a narrow particle size distribution can generally be manufactured from liquid products, such as solutions or melts, by the process of continuous spray granulation which is described, for example, in U.S. Pat. No. 3,879,855. That process is problematical, however, where the solidification of epoxy resins is concerned. For example, in the case of spray granulation of the solid solutions described in U.S. Pat. No. 5,294,683, an agglomerating, poorly flowing, lumpy material is obtained.

It has now been found that waxy, semi-solid or cohesive (sticky) materials can be solidified by means of spray granulation without any problems to form free-flowing granulates having a low dust content and a narrow particle size distribution by the addition of a small quantity of a substance having a large surface area that is insoluble therein.

The problem of solidifying waxy or sticky substances or mixtures of substances arises especially in certain applications of polymeric or polymerisable substances. Use in powder coating compositions, for example, requires a high dispersibility; in addition, the substance should be in the form of a flowable solid that is stable to storage and has as low a proportion of fine dust as possible.

The present invention accordingly relates to a process for the manufacture of a flowable granulate by means of spray granulation, which process comprises using as starting material a formulation in liquid form comprising (a) a substance or a mixture of substances that is in the form of a waxy or cohesive solid at room temperature, and
(b) up to 20% by weight, based on the amount of component (a), of a substance having a specific surface >3 $m^2/g$ that is insoluble in component (a).

The process of spray granulation is known to the person skilled in the art from numerous publications, for example from U.S. Pat. No. 3,879,855, European Patent Applications EP-A-0 087 039, EP-A-0 163 836, EP-A-0 332 929, EP-A-0 600 211 and EP-A-0 787 682, or German Offenlegungsschriften DE-A-29 41 637 and DE-A-43 04 809.

Preferably, the spray granulation is carried out as a fluidised-bed process.

In principle, spray granulation for the solidification of liquid or semi-solid epoxy resins can be carried out also as a batch process.

Preferably, however, the process is carried out continuously since, in the continuous process, the desired narrow particle size distribution can be set without any problems. Special preference is given to carrying out the spray granulation as a continuous process with sifting delivery.

By varying the process parameters (residence time, incoming air temperature, product temperature, spray pressure, spray rate, sifter air quantity) granulates having average particle diameters $d_{50}$ of from 0.1 to 10.0 mm can be produced.

Granulates having average particle diameters $d_{50}$ of from 0.3 to 5.0 mm, especially from 0.5 to 2.0 mm, are preferred.

The starting materials for the process of the invention are in liquid form, that is to say, they may be solutions, suspensions, emulsions or melts. The liquid products to be sprayed are produced according to customary methods by mixing the constituents and, where applicable, by subsequently heating the resulting mixtures.

When carrying out the process of the invention, the liquid product to be granulated is introduced into the fluidised bed through suitable spray nozzles. One-component nozzles, two-component nozzles or multiple-component nozzles can be used. The use of two-component nozzles, three-component nozzles or higher-multiple-component nozzles is advantageous. Two-component nozzles are especially preferred.

A preferred embodiment is the process of the invention wherein the liquid formulation is a suspension of component (b) in a melt or solution of component (a).

The substance (b) that is insoluble in component (a) can be in the form of a solid or in the form of a suspension in a solvent, for example in water.

When two-component nozzles are used, the liquid formulation to be granulated can be mixed in a pre-mixing zone immediately before being sprayed in. It is also possible for the melt or solution of component (a) and the suspension of component (b) to be supplied separately to a three-component nozzle. In that case, the two components do not mix until sprayed. Another preferred embodiment of the invention, therefore, is a process wherein product introduction is carried out via two-component nozzles with a pre-mixing zone or via three-component nozzles and the liquid formulation is produced immediately before being sprayed in by mixing a melt of the epoxy resin (a) and a suspension of component (b) in an inert solvent.

The process of the invention is used especially in the solidification of semi-solid and waxy or sticky synthetic polymers or corresponding monomers or oligomers, especially thermosetting resins, as component (a).

Examples of such thermosetting resins are phenolic resins, polyurethanes, unsaturated polyester resins and epoxy resins.

Preferably, an epoxy resin or a mixture of epoxy resins is used as component (a) in the process of the invention.

The epoxy resins that are customary in epoxy resin technology can be used as component (a). Examples of epoxy resins are:

I) Polyglycidyl and poly-(β-methylglycidyl) esters, obtainable by reacting a compound having at least two carboxyl groups in the molecule and epichlorohydrin or β-methylepichlorohydrin, respectively. The reaction is advantageously carried out in the presence of bases. Alternatively, such epoxy compounds can also be prepared by esterification with allyl halides and subsequent oxidation.

Aliphatic polycarboxylic acids can be used as the compound having at least two carboxyl groups in the molecule. Examples of such polycarboxylic acids are oxalic acid, succinic acid, glutaric acid, adipic acid, pimelic acid, suberic acid, azelaic acid and dimerised or trimerised linoleic acid. It is also possible, however, to use cycloaliphatic polycarboxylic acids, such as, for example, tetrahydrophthalic acid, 4-methyltetrahydrophthalic acid, hexahydrophthalic acid or 4-methylhexahydrophthalic acid. It is furthermore possible to use aromatic polycarboxylic acids, such as, for example, phthalic acid, isophthalic acid or terephthalic acid.

II) Polyglycidyl or poly-(β-methylglycidyl) ethers, obtainable by reacting a compound having at least two free alcoholic hydroxy groups and/or phenolic hydroxy groups with epichlorohydrin or β-methylepichlorohydrin under alkaline conditions or in the presence of an acidic catalyst with subsequent alkali treatment.

The glycidyl ethers of that type are derived, for example, from acyclic alcohols, e.g. from ethylene glycol, diethylene glycol or higher poly-(oxyethylene) glycols, propane-1,2-diol or poly-(oxypropylene) glycols, propane-1,3-diol, butane-1,4-diol, poly-(oxytetramethylene) glycols, pentane-1,5-diol, hexane-1,6-diol, hexane-2,4,6-triol, glycerol, 1,1,1-trimethylolpropane, pentaerythritol, sorbitol, and from polyepichlorohydrins. Other glycidyl ethers of that type are derived from cycloaliphatic alcohols, such as 1,4-cyclohexanedimethanol, bis(4-hydroxycyclohexyl)methane or 2,2-bis(4-hydroxycyclohexyl)propane, or from alcohols containing aromatic groups and/or further functional groups, such as N,N-bis(2-hydroxyethyl)aniline or p,p'-bis(2-hydroxyethylamino)diphenylmethane. The glycidyl ethers can also be based on mononuclear phenols, such as, for example, resorcinol or hydroquinone, or on polynuclear phenols, such as, for example, bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane or 3,3,3',3'-tetramethyl-5,5',6,6'-tetrahydroxy-1,1'-spirobisindane. Other suitable hydroxy compounds for the preparation of glycidyl ethers are novolaks, obtainable by condensation of aldehydes, such as formaldehyde, acetaldehyde, chloral or furfuraldehyde, with phenols or bisphenols that are unsubstituted or substituted by chlorine atoms or by $C_1$–$C_9$alkyl groups, such as, for example, phenol, 4-chlorophenol, 2-methylphenol or 4-tert-butylphenol.

III) Poly-(N-glycidyl) compounds, obtainable by dehydrochlorination of the reaction products of epichlorohydrin with amines containing at least two amine hydrogen atoms. Those amines are, for example, aniline, n-butylamine, bis(4-aminophenyl)methane, m-xylylenediamine or bis(4-methylaminophenyl)methane.

The poly-(N-glycidyl) compounds also include, however, triglycidyl isocyanurate, N,N'-diglycidyl derivatives of cycloalkylene ureas, such as ethylene urea or 1,3-propylene urea, and diglycidyl derivatives of hydantoins, such as of 5,5-dimethylhydantoin.

IV) Poly-(S-glycidyl) compounds, for example di-S-glycidyl derivatives derived from dithiols, such as, for example, ethane-1,2-dithiol or bis(4-mercaptomethylphenyl) ether.

V) Cycloaliphatic epoxy resins, such as, for example, bis(2,3-epoxycyclopentyl) ether, 2,3-epoxycyclopentylglycidyl ether, 1,2-bis(2,3-epoxycyclopentyloxy)ethane or 3,4-epoxycyclohexylmethyl-3',4'-epoxycyclohexane carboxylate.

It is also possible, however, to use epoxy resins in which the 1,2-epoxy groups are bonded to different hetero atoms or functional groups; those compounds include, for example, the N,N,O-triglycidyl derivative of 4-aminophenols, the glycidyl ether-glycidyl ester of salicylic acid, N-glycidyl-N'-(2-glycidyloxypropyl)-5,5-dimethylhydantoin and 2-glycidyloxy-1,3-bis(5,5-dimethyl-1-glycidylhydantoin-3-yl)propane.

As component (b) it is possible to use in the process of the invention in principle all compounds that are insoluble in epoxy resins and that have the required high specific surface. Such compounds are known to the person skilled in the art; it is possible to use, for example, adsorbents, such as zeolites, clays (e.g. bentonite), aerosil, micas, or also inorganic or organic pigments.

Preferably, component (b) is a urea-formaldehyde or melamine-formaldehyde condensation polymer.

Urea-formaldehyde condensation polymers are especially preferred. Organic white pigments of that kind are commercially obtainable, for example, under the name Pergopak®.

Preferably, the specific surface of the substances that can be used as component (b) is >5 $m^2/g$, more preferably >10 $m^2/g$ and most preferably >15 $m^2/g$.

Methods of determining the specific surface are generally known to the person skilled in the art. The specific surface can be determined, for example, by a modified BET adsorption of nitrogen by the method of Haul and Dumbgen (Chem.-Ing.-Techn. 35, 586 (1963)).

The amount of component (b) in the compositions according to the invention is preferably from 0.1 to 15% by weight, more preferably from 1 to 10% by weight and most preferably from 3 to 7% by weight, based on the amount of component (a).

Preferably, for the process of the invention, the solid solutions known from U.S. Pat. No. 5,294,683 as component (a) are combined with urea-formaldehyde or melamine-formaldehyde condensation polymers as component (b).

The invention further relates, therefore, to a granulate manufactured from a composition comprising (A) an epoxy resin mixture of at least one polyglycidyl compound that is solid at room temperature and at least 5% by weight, based on the total amount of all the polyglycidyl compounds, of at least one polyglycidyl compound that is liquid at room temperature, at least a portion of the solid polyglycidyl compounds being in the form of a solid mixed phase and the solid mixed phase substantially comprising the total amount of the liquid polyglycidyl compounds as additional component;

(B) up to 20% by weight, based on the amount of component A, of a solid colloidal condensation polymer of urea or melamine and formaldehyde having a specific surface >3 $m^2/g$.

Its use in the spray granulation process requires the composition of (A) and (B) to be in liquid form. If component (A) is in the form of a solid solution produced by the process described in U.S. Pat. No. 5,294,683, the substance must be melted or dissolved in a suitable solvent before being sprayed. In that case, it is possible to use both inert solvents, such as, for example, acetone, 2-butanone or ethanol, and reactive solvents, such as, for example, epichlorohydrin. It is, however, also possible to use component (A) in the form of a physical mixture of the two polyglycidyl compounds.

As the solid polyglycidyl compound, component (A) preferably comprises a diglycidyl ester or a diglycidyl ether.

Terephthalic acid diglycidyl ester is especially preferred as the solid polyglycidyl compound in component (A).

As the liquid polyglycidyl compound, component (A) preferably comprises a polyglycidyl ester or polyglycidyl ether having at least three glycidyl groups per molecule.

Especially preferred liquid polyglycidyl compounds as constituents of component (A) are trimellitic acid triglycidyl ester, trimesic acid triglycidyl ester and pyromellitic acid tetraglycidyl ester.

The solid colloidal condensation polymers of urea or melamine and formaldehyde according to component (B) of the compositions according to the invention and the preparation thereof are described in Makromol. Chem. 120, 68 (1968) and Makromol. Chem. 149, 1 (1971).

The process of the invention is suitable in general for the manufacture of pulverulent commercial forms, especially for the manufacture of waxy or cohesive substances provided for applications in which the free flowing characteristic, low dust content or an improved dispersibility is important. In the scope of this invention, the expression "having a low dust content" characterises substances or mixtures of substances in which the proportion of particles having a particle diameter <200 µm is less than 2% by volume.

An important advantage of spray granulation is the optimum heat transfer in the fluidised bed, whereby the formation of threads and sticking together of the particles is prevented. The product yields are very high, especially in the case of the continuous process.

A further advantage is that any solvents present in the starting materials are removed during the spray granulation. Using the process of the invention it is possible to manufacture from originally waxy and cohesive material a free-flowing granulate of definable particle size and narrow particle size distribution that has a low dust content and that is distinguished by a high stability to storage and an improved dispersibility in formulations.

The granulates manufactured by the process of the invention are suitable as cross-linking agents for substances having epoxy-reactive functional groups, e.g. hydroxyl, thiol, amino, amide and, especially, carboxyl groups. Other examples of suitable functional groups are described in Lee/Neville, "Handbook of Epoxy Resins", MacGraw-Hill, Inc. 1967, Appendix 5-1. For many functional groups the addition of a catalyst can be advantageous. Mixtures of that kind can generally be fully cured at temperatures of from 100 to 250° C. and have a variety of uses, e.g. as surface-coating compositions, melt adhesives, casting resins or moulding compositions. Use as cross-linking agents for those epoxy-reactive substances which are solid at room temperature or moderately elevated temperature is preferred.

An especially preferred field of use of the granulates according to the invention is that of powder coating applications.

Those powder coating compositions are preferably based on the polyesters having terminal carboxyl groups that are customarily used in that technology. The polyesters preferably have an acid number of from 10 to 100 and an average molecular weight (weight mean) of from 500 to 10 000, especially up to 2000. Such polyesters are advantageously solid at room temperature and have a glass transition temperature of from 35 to 120° C., preferably from 40 to 80° C. Suitable polyesters are known, for example, from U.S. Pat. No. 3,397,254.

The invention further relates, therefore, to a powder coating composition comprising a carboxyl-group-containing polyester and a granulate manufactured by the process of the invention.

EXAMPLES

In the Examples which follow, the following substances are used:

Epoxy resin 1: solid solution of 75% by weight terephthalic acid diglycidyl ester and 25% by weight trimellitic acid triglycidyl ester, prepared according to U.S. Pat. No. 5,294,683;

Pergopak® M2: urea-formaldehyde condensation product having on average 0.6% reactive methylol groups and a specific surface of 20±3 $m^2/g$ (determined by the BET method), water content approx. 30% by weight;

Pergopak® HP: urea-formaldehyde condensation product having on average 0.6% reactive methylol groups and a specific surface of 20±3 $m^2/g$ (determined by the BET method), water content approx. 70% by weight;

Aerosil® 200: highly disperse silicic acid

Alftalate® 9952: carboxyl-terminated polyester (manufactured by Hoechst)

Acrylron®: flow auxiliary based on an acrylated polyacrylate (manufactured by Protex)

Catalyst 1: concentrate of a tetraalkylammonium bromide salt

Example 1

33.3 kg of epoxy resin 1 are dissolved with stirring at 55° C. in 66.7 kg of acetone. 3.33 kg of Pergopak® M2 and 0.33 kg of Aerosil® 200 are added to the clear solution, a finely particulate homogeneous suspension being formed. From the suspension so prepared, a granulate is produced in a GPCG-3 system (Glatt GmbH, Binzen, Germany) by means of discontinuous spray granulation. The process parameters are given in Table 1.

Examples 2 and 3

Analogously to Example 1, various amounts of epoxy resin 1 and Pergopak are suspended in acetone. By means of discontinuous spray granulation there are produced from those suspensions granulates consisting of free-flowing particles having a low dust content and an average particle diameter $d_{50}$ of approximately 300 µm. In the case of longer process times, shifting of the maximum of the particle size distribution to higher values is observed. The compositions and the process parameters are given in Table 1.

TABLE 1

| Example | composition | $T_{air, in}$ [° C.] | $T_{prod}$ [° C.] | $P_{atom}$ [bar] | $r_{spray}$ [g/min] |
|---------|-------------|------|------|------|------|
| 1 | 66.7 kg acetone<br>33.3 kg epoxy resin 1<br>3.33 kg Pergopak® M2<br>0.33 kg Aerosil® 200 | 70–55 | 52–44 | 2.5 | 10–17 |

TABLE 1-continued

| Example | composition | $T_{air,\ in}$ [°C.] | $T_{prod}$ [°C.] | $P_{atom}$ [bar] | $r_{spray}$ [g/min] |
|---|---|---|---|---|---|
| 2 | 60.0 kg acetone<br>40.0 kg epoxy resin 1<br>4.0 kg Pergopak ® M2 | 65–75 | 57–45 | 2.5 | 18–28 |
| 3 | 60.0 kg acetone<br>40.0 kg epoxy resin 1<br>2.0 kg Pergopak ® M2 | 65–80 | 48–38 | 2.5 | 14 |

$T_{air,\ in}$: temperature of incoming air
$T_{prod}$: product temperature
$P_{atom}$: spray pressure
$r_{spray}$: spray rate Examples 4 and 5

33 g of epoxy resin 1 are dissolved with stirring at 75° C. in 67 g of epichlorohydrin. 1.65 g of Pergopak® M2 (Example 4) or Pergopak® HP (Example 5) are added to the clear solution, a finely particulate homogeneous suspension being formed. From the suspension so prepared, a granulate is produced in a GPCG-3 system (Glatt GmbH, Binzen) by means of discontinuous spray granulation. The process parameters are given in Table 2.

TABLE 2

| Example | composition | $T_{air,\ in}$ [°C.] | $T_{prod}$ [°C.] | $P_{atom}$ [bar] | $r_{spray}$ [g/min] |
|---|---|---|---|---|---|
| 4 | 66 g epichlorohydrin<br>33 g epoxy resin 1<br>1.65 g Pergopak® M2 | 86–74 | 73–44 | 2.5 | 5–17 |
| 5 | 66 g epichlorohydrin<br>33 g epoxy resin 1<br>1.65 g Pergopak® HP | 92–65 | 71–44 | 2.5 | 6–10 |

$T_{air,\ in}$: temperature of incoming air
$T_{prod}$: product temperature
$P_{atom}$: spray pressure
$r_{spray}$: spray rate Example 6

15 kg of epoxy resin 1 are melted at 140° C. With stirring (propeller stirrer), 0.75 kg of Pergopak® HP is added; the resulting melt suspension is subsequently homogenised with a high-speed stirrer (Ultra-Turrax). That preparation step is necessary to prevent clogging of the nozzle by relatively large Pergopak agglomerates. The low-viscosity melt suspension so obtained (viscosity: approx. 100–200 mPa.s) is fed to the spray nozzle by means of a peristaltic pump, the hose lines being heated electrically. In a GPCG 15 fluidised-bed system (Glatt GmbH, Binzen), a granulate is produced from the melt by means of discontinuous spray granulation. The spray arrangement is a so-called "top spray" design, that is to say, with the spray direction from top to bottom counter to the incoming air stream using a two-component nozzle manufactured by Schlick having a hole diameter of 2.2 mm. The relevant process parameters are given in Table 3. The granulates produced have a low dust content, are free-flowing and are distinguished by a loose particle structure which facilitates dispersibility in the preparation of powder coating compositions.

Examples 7–11

30 kg of epoxy resin 1 are melted in a liquid-temperature-controlled heating tank (temperature of the heating medium approx. 150° C.). After the melt has cooled to 100° C., 1.5 kg of Pergopak® HP (Example 7) or Pergopak® M2 (Examples 8–11) are added and suspended with stirring (turbo stirrer). To deliver the melt suspension at high spray rates (10–49 kg/h) a gear pump (Netsch Mono Pump) is used. In an AGT 400 fluidised-bed system (Glatt Ingenieurtechnik GmbH, Weimar, Germany) a granulate is produced from the melt by means of continuous spray granulation. The spray direction is from bottom to top (in the direction of the incoming air) using a two-component nozzle manufactured by Glatt having a hole diameter of 5 mm. All the components of the melt feed line are heated electrically. The granulated product is removed from the product vessel continuously through a centrally arranged, single counter-flow sifter. The quantity of classifying air is 90–140 m³/h. The relevant process parameters are given in Table 3.

Example 12

A melt of epoxy resin 1 and an aqueous suspension of Pergopak® M2 (15% by weight solid) are fed separately to a two-component nozzle having a short mixing section. After a relatively short mixing time (approx. 10 seconds residence time), the mixture is sprayed in the form of a multi-phase system.

TABLE 3

| Example | process type | $T_{air,\ in}$ [°C.] | $T_{prod}$ [°C.] | $F_{air}$ [m³/h] | $P_{atom}$ [bar] | $r_{spray}$ [g/min] | y [%] |
|---|---|---|---|---|---|---|---|
| 6 | batch | 40<br>40 | 40<br>40 | 400 | 4.0 | 6.4 | 98 |
| 7 | continuous | 42<br>33 | 38<br>44 | 1051<br>1208 | 2.0 | 25–49 | 98.6 |
| 8 | continuous | 38<br>43 | 32<br>44 | 958<br>1204 | 2.0 | 10–42 | 96.0 |
| 9 | continuous | 43<br>40 | 40<br>45 | 1094<br>1251 | 2.0 | 21–26 | 95 |
| 10 | continuous | 30<br>30 | 36<br>37 | 1000<br>1010 | 3.0 | 25 | 97.0 |
| 11 | continuous | 29<br>29 | 37<br>37 | 1139<br>1137 | 3.0 | 34 | 97.0 |
| 12 | continuous | 46<br>52 | 24<br>36 | 1063<br>1184 | 3.0 | 23 (melt)<br>13 (slurry) | |

$T_{air,\ in}$: temperature of incoming air
$T_{prod}$: product temperature
$F_{air}$: quantity of incoming air
$P_{atom}$: spray pressure
$r_{spray}$: spray rate
y: yield Examples of Applications The granulates produced in Example 9 (granulate 1, average particle size 2 mm) and 10 (granulate 2, average particle size 1 mm) are mixed with the substances indicated in Table 4 and homogenised at 90° C. in a twin-screw extruder (Prism TSE 16 PC). When cool, the extrudate is ground to an average particle size of 40 µm (Retsch ZSM 1000 ultracentrifugal mill). Particles having sizes >100 µm are removed by sieving. The gelling times of the powder coating compositions measured in accordance with ISO 8130 are given in Table 4. The powder coating composition is electrostatically sprayed onto test plates (chromatized aluminium) and stoved at 200° C. for 15 minutes. The properties of the coatings so produced are listed in Table 4 (Examples I and II).

In the Comparison Examples III and IV, flakes of pure epoxy resin 1 (hardener 3, average particle size 8 mm) and a powder produced from those flakes by cryo-grinding (hardener 4, average particle size 3 mm) are respectively used as powder coating composition hardeners. The results show that the powder coating compositions with the granulates according to the invention provide comparable properties, but have a considerably higher stability to storage.

TABLE 4

| Example | I | II | III | IV |
|---|---|---|---|---|
| granulate 1 [g] | 4.55 | | | |
| granulate 2 [g] | | 4.53 | | |
| hardener 3 [g] | | | 4.21 | |
| hardener 4 [g] | | | | 4.21 |
| Alftalat ® 9952 [g] | 59.41 | 59.43 | 59.76 | 59.76 |
| benzoin [g] | 0.20 | 0.20 | 0.20 | 0.20 |
| Acrylron ® [g] | 1.50 | 1.50 | 1.50 | 1.50 |
| catalyst 1 [g] | 1.0 | 1.0 | 1.0 | 1.0 |
| $TiO_2$ (Cronos 2160) [g] | 33.33 | 33.33 | 33.33 | 33.33 |
| properties of the unhardened powder coating composition: | | | | |
| gelling time at 180° C. [s] | 200 | 185 | 180 | 205 |
| powder quality[1] | | | | |
| after 3 days' storage | 8 | 8 | 8 | 6 |
| after 7 days' storage | 8 | 8 | 7 | 5 |
| after 14 days' storage | 8 | 8 | 7 | 7 |
| after 21 days' storage | 8 | 7 | 6 | 5 |
| after 28 days' storage | | 8 | 7 | 5 |
| properties of the hardened powder coating composition: | | | | |
| layer thickness [μm] | 67 | 65 | 56 | 60 |
| impact deformation, rear side [kg · cm] | 160 | 160 | 160 | 160 |
| gloss at an angle of 20° [%] | 86 | 85 | 88 | 89 |
| gloss at an angle of 60° [%] | 94 | 94 | 95 | 95 |

[1]powder quality: measure of the resistance of the powder to caking ("caking resistance"); is determined after storage at 40° C. and evaluated visually with ratings from 1 to 10, wherein 10 = unchanged, 0 = agglomerated; formulations with ratings >5 can be applied

What is claimed is:

1. A process for the manufacture of a flowable granulate by means of spray granulation, which comprises using as starting material a formulation in liquid form comprising
   (a) a substance or a mixture of substances that is in the form of a waxy or cohesive solid at room temperature, and
   (b) up to 20% by weight, based on the amount of component (a), of a substance having a specific surface >3 m²/g that is insoluble in component (a).

2. A process according to claim 1, wherein the spray granulation is carried out as a fluidised-bed process.

3. A process according to claim 1, wherein the spray granulation is carried out as a continuous process.

4. A process according to claim 1, wherein the spray granulation is carried out as a continuous process with sifting delivery.

5. A process according to claim 1, wherein the liquid formulation is a suspension of component (b) in a melt or a solution of component (a).

6. A process according to claim 1, wherein product introduction is carried out via two-component nozzles, three-component nozzles or higher-multiple-component nozzles.

7. A process according to claim 1, wherein component (a) is an epoxy resin or a mixture of epoxy resins.

8. A granulate manufactured by the process according to claim 1.

9. A granulate according to claim 8, manufactured from a composition comprising
   (A) an epoxy resin mixture of at least one polyglycidyl compound that is solid at room temperature and at least 5% by weight, based on the total amount of all the polyglycidyl compounds, of at least one polyglycidyl compound that is liquid at room temperature, at least a portion of the solid polyglycidyl compounds being in the form of a solid mixed phase and the solid mixed phase substantially comprising the total amount of the liquid polyglycidyl compounds as additional component;
   (B) up to 20% by weight, based on the amount of component A, of a solid colloidal condensation polymer of urea or melamine and formaldehyde having a specific surface >3 m²/g.

10. A granulate according to claim 9, wherein component (A) comprises a diglycidyl ester or a diglycidyl ether as the solid polyglycidyl compound.

11. A granulate according to claim 9, wherein component (A) comprises terephthalic acid diglycidyl ester as the solid polyglycidyl compound.

12. A granulate according to claim 9, wherein component (A) comprises a polyglycidyl ester or polyglycidyl ether having at least three glycidyl groups per molecule as the liquid polyglycidyl compound.

13. A granulate according to claim 9, wherein component (A) comprises trimellitic acid triglycidyl ester, trimesic acid triglycidyl ester or pyromellitic acid tetraglycidyl ester as the liquid polyglycidyl compound.

14. A granulate according to claim 9, wherein component (B) is a urea-formaldehyde condensation polymer.

15. A granulate according to claim 9, wherein component (B) has a specific surface of >5 m²/g.

16. A granulate according to claim 9, comprising from 1 to 10% by weight of component B, based on the amount of component A.

17. A powder coating composition comprising a carboxyl-group-containing polyester and a granulate manufactured by the process according to claim 7.

* * * * *